(12) United States Patent
Kariya et al.

(10) Patent No.: US 9,044,920 B2
(45) Date of Patent: Jun. 2, 2015

(54) HIGH STRENGTH GALVANIZED STEEL SHEET EXHIBITING EXCELLENT FATIGUE PROPERTY

(75) Inventors: Nobusuke Kariya, Fukuyama (JP); Hayato Saito, Fukuyama (JP); Takeshi Yokota, Chiba (JP); Yusuke Fushiwaki, Fukuyama (JP)

(73) Assignee: JFE Steel Corporation, Tokyo (JP)

( * ) Notice: Subject to any disclaimer, the term of this patent is extended or adjusted under 35 U.S.C. 154(b) by 45 days.

(21) Appl. No.: 13/876,659

(22) PCT Filed: Sep. 28, 2011

(86) PCT No.: PCT/JP2011/072902
§ 371 (c)(1),
(2), (4) Date: Jul. 10, 2013

(87) PCT Pub. No.: WO2012/043863
PCT Pub. Date: Apr. 5, 2012

(65) Prior Publication Data
US 2013/0280551 A1      Oct. 24, 2013

(30) Foreign Application Priority Data
Sep. 30, 2010   (JP) ................ 2010-220715

(51) Int. Cl.
*B32B 15/18*   (2006.01)
*C23C 2/02*   (2006.01)
(Continued)

(52) U.S. Cl.
CPC ......... *B32B 15/18* (2013.01); *Y10T 428/12667* (2015.01); *Y10T 428/12611* (2015.01);
(Continued)

(58) Field of Classification Search
CPC ...... B32B 15/04; B32B 15/043; B32B 15/18; C23C 2/02; C23C 2/06; C23C 2/28; C23C 28/025; C23C 30/00; C23C 30/005; C22C 38/001; C22C 38/02; C22C 38/04; C22C 38/06; C22C 38/08; C22C 38/12; C22C 38/14; C22C 38/16; C22C 38/18; C22C 38/20; C22C 38/22; C22C 38/26; C22C 38/28; C22C 38/38; C22C 38/60; Y10T 428/12799; Y10T 428/12667; Y10T 428/12611; Y10T 428/1266; Y10T 428/12618
USPC ......... 428/632, 633, 639, 640, 659, 684, 213, 428/215, 216, 219, 332, 334, 336, 340
See application file for complete search history.

(56) References Cited

U.S. PATENT DOCUMENTS

2011/0017363 A1 * 1/2011 Kang et al. .................. 148/534

FOREIGN PATENT DOCUMENTS

JP   09-078214 A   3/1997
JP   11-199973 A   7/1999
(Continued)

OTHER PUBLICATIONS
Machine Translation, Taro et al., JP 2007-092126, Apr. 2007.*
(Continued)

*Primary Examiner* — Michael E La Villa
(74) *Attorney, Agent, or Firm* — RatnerPrestia

(57) ABSTRACT

A high strength galvanized steel sheet having tensile strength of 590MPa or more which is excellent in fatigue property in punching work, and a manufacturing method thereof are provided. The microstructure includes a ferrite phase having an average grain diameter of 15 μm or less and an area fraction of 60% or more and a martensite phase having an area fraction of 5 to 40%, and an amount of one or more kinds of oxide selected from a group consisting of Fe, Si, Mn, Al, P, Nb, and Ti generated on a surface layer portion of the steel sheet within 100 μm in a steel-sheet-side depth direction from a surface of a base steel sheet directly below a galvanized layer is less than 0.060 g/m² per one-side surface of the steel sheet.

2 Claims, 1 Drawing Sheet

(51) Int. Cl.
| | |
|---|---|
| *C21D 8/04* | (2006.01) |
| *C21D 9/48* | (2006.01) |
| *C21D 9/56* | (2006.01) |
| *C22C 38/00* | (2006.01) |
| *C22C 38/02* | (2006.01) |
| *C22C 38/06* | (2006.01) |
| *C22C 38/12* | (2006.01) |
| *C22C 38/14* | (2006.01) |
| *C22C 38/38* | (2006.01) |
| *C22C 38/60* | (2006.01) |
| *C23C 2/06* | (2006.01) |
| *C23C 2/28* | (2006.01) |
| *C21D 8/02* | (2006.01) |

(52) U.S. Cl.
CPC .... *Y10T428/1266* (2015.01); *Y10T 428/12618* (2015.01); *C21D 8/0226* (2013.01); *C21D 8/0436* (2013.01); *C21D 8/0473* (2013.01); *C21D 9/48* (2013.01); *C21D 9/561* (2013.01); *C21D 2211/005* (2013.01); *C21D 2211/008* (2013.01); *C22C 38/001* (2013.01); *C22C 38/02* (2013.01); *C22C 38/06* (2013.01); *C22C 38/12* (2013.01); *C22C 38/14* (2013.01); *C22C 38/38* (2013.01); *C22C 38/60* (2013.01); *C23C 2/02* (2013.01); *C23C 2/06* (2013.01); *C23C 2/28* (2013.01)

(56) References Cited

FOREIGN PATENT DOCUMENTS

| | | |
|---|---|---|
| JP | 11-279690 A | 10/1999 |
| JP | 2004-211138 A | 7/2004 |
| JP | 2004-315902 A | 11/2004 |
| JP | 2007-092126 A | 4/2007 |
| WO | WO 2008/078912 * | 7/2008 |
| WO | WO 2009/084795 A1 | 7/2009 |

OTHER PUBLICATIONS

Machine Translation, Tetsuo et al., JP 2004-211138, Jul. 2004.*
International Search Report dated Jan. 10, 2012, application No. PCT/JP2011/072902.

* cited by examiner

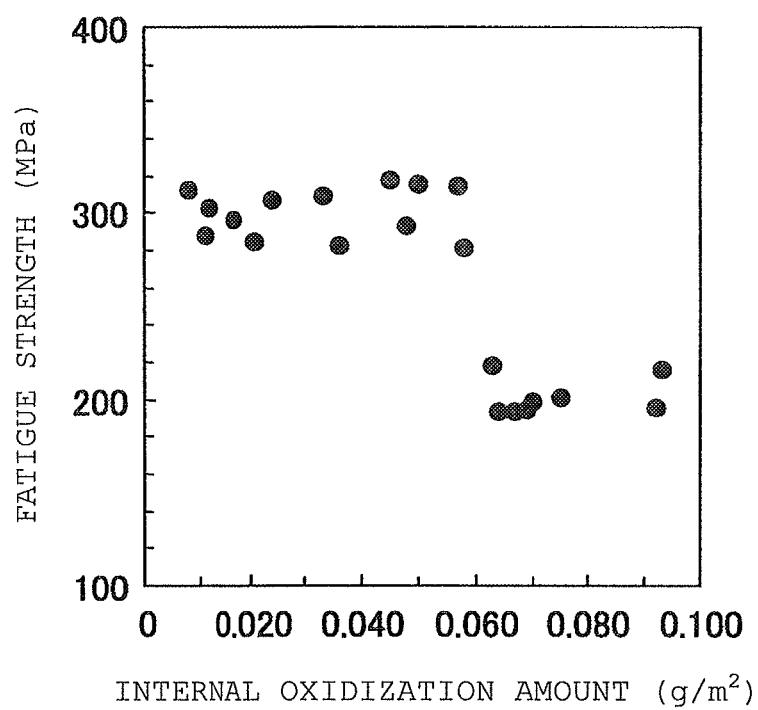

HIGH STRENGTH GALVANIZED STEEL SHEET EXHIBITING EXCELLENT FATIGUE PROPERTY

This application is the U.S. National Phase application of PCT International Application No. PCT/JP2011/072902, filed Sep. 28, 2011, and claims priority to Japanese Patent Application No. 2010-220715, filed Sep. 30, 2010, the disclosure of both are incorporated herein by referene in their entireties for all purposes.

TECHNICAL FIELD

The present invention relates to a high strength galvanized steel sheet having an excellent fatigue property preferably applicable to automotive parts and the like, and a method of manufacturing the same.

BACKGROUND ART

Recently, from a viewpoint of preservation of a global environment, attempts have been made to reduce exhaust gas such as $CO_2$. In automobile industries, there has been taken a countermeasure which lowers a quantity of exhaust gas by improving fuel consumption by making a vehicle body light-weighted.

As one of techniques for making the vehicle body light-weighted, there has been named a technique which decreases a sheet thickness by strengthening a steel sheet used for manufacturing an automobile. Further, a steel sheet used around a floor is also requested to exhibit rust prevention property together with the reduction of wall thickness of the steel sheet by strengthening the steel sheet. For this end, application of a high strength galvanized steel sheet has been studied. Further, parts around a floor receive strong vibrations during traveling in the same manner as chassis parts (such as lower arms) and hence, high durability against vibrations is requested so that a steel sheet for manufacturing these parts is requested to exhibit excellent fatigue strength.

To ensure plating and chemical conversion treatment property after assembling a vehicle body, it is often the case where punching work is applied to a part around a floor, and it is known that a fatigue property of a portion which is subjected to punching work and constitutes a stress concentration portion deteriorates more compared to fatigue property of a smooth member. Accordingly, there has been a demand for the improvement of fatigue property in punching work.

To satisfy such requirements patent document 1, for example, proposes a high strength cold-rolled steel sheet exhibiting excellent fatigue property and a method of manufacturing the steel sheet, wherein the composition is adjusted to a proper range, the microstructure of the steel sheet is of the multiphase structure of two phases where a main phase is of a ferrite phase and a second phase is of a martensite phase or of a martensite and a retained austenite phases, and a size of Cu grains in the ferrite phase is defined.

Patent document 2 proposes a working-use high strength cold-rolled steel sheet exhibiting excellent fatigue property and a method of manufacturing the steel sheet, wherein the composition is adjusted to proper ranges, the microstructure is of the multiphase microstructure consisting of a ferrite phase, a bainite phase, a retained austenite phase and a martensite phase, and a size of Cu grains in the ferrite phase is optimized.

However, in techniques disclosed in patent document 1 and patent document 2, fatigue strength is evaluated using plane bending fatigue specimens having a notch, wherein the specimen is a machined end surface, and the influence which initial cracks on the end surface brought about by punching work exerts on a fatigue strength is not taken into consideration at all.

Patent document 3 proposes a high strength hot-rolled steel sheet which exhibits excellent fatigue property and excellent stretch-flangeability on a punched end surface where the composition is adjusted to a proper range, alumina-based oxide and titanium nitride are suppressed, and the microstructure adopts a bainitic ferrite as a main phase, and a method of manufacturing the high strength hot-rolled steel sheet.

However, although patent document 3 evaluates fatigue property by taking the punched hole end surface into consideration, patent document 3 completely fails to disclose fatigue property by taking a punched hole end surface of a high-strength galvanized steel sheet into consideration.

PRIOR ART DOCUMENT

Patent Document

[Patent document 1] JP11-199973A
[Patent document 2] JP11-279690A
[Patent document 3] JP2004-315902A

SUMMARY OF THE INVENTION

Problem to be Solved of the Invention

The present invention has been made under such circumstances, and it is an object of the present invention to provide a high-strength galvanized steel sheet which exhibits excellent fatigue property in punching work and has a tensile strength of 590 MPa or more and a manufacturing method of the high strength galvanized steel sheet.

Means for Solving the Problem

To achieve the above-mentioned objects, inventors of the present invention have made extensive studies on fatigue property after punching work. As a result, the inventors have found that it is extremely important to adjust the composition in a proper range and to properly control the metallic microstructure and a manufacturing condition (particularly, a manufacturing condition in a continuous galvanizing treatment step). Further, the inventors also have found that the fatigue property after punching work can be improved by providing a high-strength galvanized steel sheet with the metallic microstructure which includes a ferrite phase having an average grain diameter of 15 μm or less and an area fraction of 60% or more and a martensite phase having an area fraction of 5 to 40%, and by setting an amount of one or more kinds of oxide (also referred to as inner oxidization amount) selected from a group consisting of Fe, Si, Mn, Al, P, Nb, and Ti generated on a surface layer portion of the steel sheet within 100 μm in a steel-sheet-side depth direction from a surface of a base steel sheet directly below a galvanized layer to 0.060 g/m² per one-side surface of the steel sheet.

The present invention has been made based on the above-mentioned finding, and includes the following technical features.

[1] A high strength galvanized steel sheet exhibiting excellent fatigue property, the steel sheet having a composition containing by mass % 0.03 to 0.15% C, 2.00% or less Si, 1.0 to 2.5% Mn, 0.050% or less P, 0.0100% or less S, 0.050% or less Al, 0.0050% or less N, 0.010 to 0.100% Ti, 0.010 to 0.100% Nb, 0.0010 to 0.0100% Sb, and Fe and unavoidable impurities as a balance, wherein the microstructure includes a ferrite phase having an average grain diameter of 15 μm or less and an area fraction of 60% or more and a martensite phase having an area fraction of 5 to 40%, and an amount of one or more kinds of oxide selected from a group consisting of Fe, Si, Mn, Al, P, Nb and Ti generated in a surface layer portion of the steel sheet within a range from a surface of a base steel sheet directly below a galvanized layer to 100 μm away from the surface in a direction of steel-sheet-side depth is less than 0.060 g/m² per one-side surface of the steel sheet.

[2] The high strength galvanized steel sheet exhibiting excellent fatigue property according to [1], wherein the composition further contains by mass % one or more kinds of elements selected from a group consisting of 0.05 to 0.80% Cr, 0.01 to 0.10% V, 0.01 to 0.10% Cu, 0.01 to 0.10% Ni, 0.001 to 0.010% Sn, 0.01 to 0.50% Mo, and 0.001 to 0.010% Ta.

[3] A method of manufacturing a high strength galvanized steel sheet exhibiting excellent fatigue property, wherein in finish rolling a steel having the composition described in claim 1 or claim 2 at a temperature of an $Ar_3$ point or above, coiling at a temperature of 600° C. or below and continuous galvanizing treatment after pickling, in the continuous galvanizing treatment, the steel is soaked at a temperature of 700 to 900° C., is annealed with a dew point of an atmosphere within a temperature range of 700° C. or above set to −40° C. or below, is cooled to a temperature of 600° C. or below at an average cooling rate of 1 to 50° C./sec and, thereafter, is subjected to galvanizing treatment.

[4] A method of manufacturing a high strength galvanized steel sheet exhibiting excellent fatigue property, wherein in finish rolling a steel having the composition described in [1] or [2] at a temperature of an $Ar_3$ point or above, coiling at a temperature of 600° C. or below, cold rolling at a reduction of 40% or more after pickling, and continuous galvanizing treatment subsequently, in the continuous galvanizing treatment, the steel is soaked at a temperature of 700 to 900° C., is annealed with a dew point of an atmosphere within a temperature range of 700° C. or above set to −40° C. or below, is cooled to a temperature of 600° C. or below at an average cooling rate of 1 to 50° C./sec and, thereafter, is subjected to galvanizing treatment.

[5] The method of manufacturing a high strength galvanized steel sheet exhibiting excellent fatigue property according to [3] or [4], wherein alloying treatment is further performed after the galvanizing treatment.

In the present invention, "high strength" means tensile strength TS of 590 MPa or more. With respect to the high strength galvanized steel sheet of the present invention, a base steel sheet for galvanizing includes both a cold-rolled steel sheet and a hot-rolled steel sheet. Further, the high strength galvanized steel sheet includes both a plated steel sheet to which alloying treatment is not applied after galvanizing treatment (also referred to as GI hereinafter) and a plated steel sheet to which alloying treatment is applied after galvanizing treatment (also referred to as GA hereinafter).

Advantage of the Invention

According to the present invention, a high strength galvanized steel sheet which exhibits excellent fatigue property and has a tensile strength of 590 MPa or more can be acquired.

BRIEF DESCRIPTION OF THE DRAWINGS

FIG. 1 is a view showing the relationship between an internal oxidization amount generated on a surface layer portion of a steel sheet within 100 μm in the steel-sheet-side depth direction from a surface of a base steel sheet directly below a galvanized layer and fatigue strength of the steel sheet in a test with a repetition number of $2\times10^6$.

MODE FOR CARRYING OUT THE INVENTION

Hereinafter, the present invention is specifically explained in detail. Here, in the explanation made hereinafter, the unit of the content of each element in the steel composition is "mass %", and the unit is indicated by symbol "%" unless otherwise specified.

First of all, the structure of a surface of a base steel sheet directly below a galvanized layer and fatigue strength which are most important requirements of the present invention are explained.

The result of experiments and studies leading to the completion of the present invention is explained. A steel slab which contains by mass % 0.09% C, 0.55% Si, 1.55% Mn, 0.025% P, 0.0007% S, 0.035% Al, 0.0025% N, 0.015% Ti, 0.03% Nb, 0.0015% Sb, and Fe and unavoidable impurities as a balance was subjected to hot rolling consisting of rough rolling and finish rolling carried out through 7 passes thus forming a hot-rolled steel sheet having a sheet thickness of 3.6 mm. Here, a finish rolling temperature was set to 850° C. ($Ar_3$ point: 758° C.), and a coiling temperature was set to 570° C. Next, pickling was applied to the obtained hot-rolled steel sheet and, thereafter, cold rolling (reduction rate: 61%, sheet thickness: 1.4 mm) and continuous galvanizing treatment were applied to the steel sheet thus producing test pieces having a sheet thickness of 1.4 mm. In the continuous galvanizing treatment, a soaking temperature was set to 800° C., and a dew point in an annealing furnace was changed from −30 to −60° C.

The observation of the metallic microstructure and the investigation of an internal oxidization amount were carried out with respect to the test pieces obtained as described above, and tensile property and fatigue property after punching work were evaluated.

The observation of the metallic microstructure was carried out such that an area of the specimen at a position away from a surface of the specimen by ¼ of sheet thickness in cross section parallel to the rolling direction was polished and etched by nital, three respective portions on the cross section were observed using a scanning electron microscope (SEM) at magnification of 1000 times over ten fields of view for every position (30 fields of view in total), and images obtained by such observation were measured by image analysis processing using "Image Pro Plus ver.4.0" which is an image analysis software made by Media Cybernetics, Inc. That is, a ferrite phase, a pearlite phase, a cementite phase, a martensite phase and a bainite phase are discriminated from each other by the image analysis thus obtaining an average grain diameter of the ferrite phase, an area fraction of the ferrite phase and an area fraction of the martensite phase. An average grain diameter of the ferrite phase was obtained such that areas of ferrite grains were obtained by image processing and equivalent diameters of area circles in each field of view were calculated, and an average of these values was obtained (30 fields of view). To be more specific, an equivalent diameter of area circle was obtained by taking an SEM image into the analysis software as digital data and by binarizing the digital data. An area fraction of the ferrite phase and an area fraction of the martensite phase were respectively obtained by discriminating the respective phases on a digital image and by performing image processing for every measurement field of view. Area fractions of the respective phases were obtained by averaging these values (30 fields of view).

An internal oxidation amount was measured by an "impulse furnace melting-infrared absorption method". However, it is necessary to subtract an oxygen amount contained in the steel (that is, the high strength steel sheet before being subjected to annealing). Accordingly, in the present invention, respective surface layer portions of both surfaces of the high strength steel sheet after continuous galvanizing treatment were polished by 100 μm respectively and the oxygen concentration in steel was measured, and the measured value was set as an oxygen amount OH contained in the steel. Further, the oxygen concentration in steel in the whole sheet thickness direction of the high strength steel sheet after continuous galvanizing treatment was measured, and the measured value was set as an oxygen amount OI contained in the steel after internal oxidation. Using the oxygen amount OI in the high strength steel sheet after the internal oxidation obtained as described above and the oxygen amount OH contained in the steel, the difference between OI and OH (=OI−OH) was calculated and, further, a value (g/m$^2$) obtained by converting the difference between OI and OH into an oxygen amount per one-side unit area (that is, 1 m$^2$) was set as an internal oxidation amount.

Further, with respect to the composition of oxide, a surface layer portion of the steel sheet ranging from a surface of a base steel sheet directly below a galvanized layer to a position 100 μm away from the surface in the steel sheet-side depth direction was observed at magnification of 3000 times per 1 field of view using an energy-dispersive X-ray spectrometer (EDS) mounted on the scanning electron microscope (SEM) thus identifying the composition of oxide. The observation was performed in 30 fields of view, and detected elements were determined as the composition of oxide of the observation sample.

In this experiment, the internal oxidation amount generated in the surface layer portion of the steel sheet within a range from the surface of the base steel sheet directly below the galvanized layer to a position 100 μm away from the surface in the steel sheet-side depth direction changed corresponding to a condition of the continuous galvanizing treatment. In this experiment, under any condition, an average grain diameter of the ferrite phase was 15 μm or less, an area fraction of the ferrite phase was 60% or more, an area fraction of the martensite phase was 5 to 40%, and the total area fraction of the martensite and ferrite phases was 95% or more.

For evaluating fatigue property after punching work, test pieces for fatigue test (size: 50 mm×260 mm) were sampled from the obtained test pieces, tensile fatigue specimens having a size: 45 mm×250 mm, a parallel portion width: 30 mm and R: 100 mm were prepared, and a hole having a diameter of 10 mmϕ was formed at the center of the specimen by punching work with a clearance of 10%. Thereafter, a tensile fatigue test was carried out until the repetition number of $2 \times 10^6$ using a servo pulser made by SHIMADZU CORPORATION in a state where a stress ratio was set to 0.1, a repetition cycle was set to 20 Hz and a maximum stress was fixed, and the fatigue strength at the repetition number of $2 \times 10^6$ was obtained. Average fatigue strength was obtained by carrying out the substantially equal test three times.

With respect to tensile strength, JIS No. 5 tensile specimens were sampled, and a tensile test was carried out in accordance with JIS Z2241.

In the tensile test, tensile strength was obtained by carrying out the tensile test until the tensile specimen was broken. The substantially equal tests were carried out twice for every specimen, an average value of the tensile strengths was obtained, and the obtained average value was set as the tensile strength of the specimen.

The obtained result is shown in FIG. 1.

In FIG. 1, all steel sheets have the microstructure where an average grain diameter of the ferrite phase was 15 μm or less, an area fraction of the ferrite phase was 60% or more, an area fraction of the martensite phase was 5 to 40%, and tensile strength was 590 MPa or more. As shown in FIG. 1, it is understood that when the internal oxidation amount generated in the surface layer portion of the steel sheet within a range from the surface of the base steel sheet directly below the galvanized layer to a position 100 μm away from the surface in the steel sheet-side depth direction becomes less than 0.060 g/m$^2$ per one-side surface of the steel sheet, fatigue strength of the steel sheet at the repetition number of $2 \times 10^6$ was enhanced so that the steel sheet acquired favorable fatigue property.

Next, the composition of steel of a high strength galvanized steel sheet exhibiting excellent fatigue property according to the present invention is explained.

C: 0.03 to 0.15%

C is an indispensable element for ensuring desired strength, and it is necessary for the steel sheet to contain 0.03% or more C to acquire such an effect. On the other hand, when C is added to the steel sheet in excess of 0.15%, a hole end surface is excessively hardened when a hole is formed by punching work thus lowering fatigue strength of the steel sheet. Accordingly, the content of C is limited to a value which falls within a range of 0.03% to 0.15%.

Si: 2.00% or less

Si is an element effective for increasing strength of steel. However, when the content of Si exceeds 2.00%, a grain diameter of ferrite becomes excessively large after annealing and hence, the steel sheet cannot acquire desired strength. Further, the difference in hardness between the ferrite phase and the martensite phase is increased and hence, a propagation speed of fine cracks which are generated by punching work becomes fast whereby fatigue strength of the steel sheet after punching work is lowered. Accordingly, the content of Si is set to 2.00% or less.

Mn: 1.0 to 2.5%

Mn is an indispensable element for ensuring a desired strength as well as C. It is necessary to set a lower limit of the content of Mn to 1.0% to allow the steel sheet to acquire desired strength. On the other hand, when Mn is added to the steel sheet in excess of 2.5%, as well as the excessive addition of C, a hole end surface is excessively hardened due to working thus lowering the fatigue strength. Accordingly, the content of Mn is limited to a value which falls within a range of 1.0% to 2.5%.

P: 0.050% or less

P is an element effective for increasing strength of steel. However, when the content of P exceeds 0.050%, peeling of a surface oxidized layer (scale) generated in hot rolling is excessively increased thus deteriorating surface quality after galvanizing. Accordingly, the content of P is set to 0.050% or less.

S: 0.0100% or less

When the content of S exceeds 0.0100%, an amount of non-metallic inclusion such as MnS is increased and hence, cracks are liable to occur on a hole end surface in punching work thus lowering fatigue strength. Accordingly, the content of S is set to 0.0100% or less.

Al: 0.050% or less

The content of Al is preferably set to 0.010% or more for deoxidization of steel. On the other hand, when the content of Al exceeds 0.050%, surface appearance of steel after galvanizing is remarkably deteriorated and hence, an upper limit of the content of Al is set to 0.050%.

N: 0.0050% or less

N does not deteriorate advantageous effects of the present invention provided that the content of N is set to 0.0050% or less which is the content of N contained in ordinary steel. Accordingly, the content of N is set to 0.0050% or less.

Ti: 0.010 to 0.100%, Nb: 0.010 to 0.100%

Ti and Nb are added to increase strength of steel through the refinement of the microstructure and the precipitation strengthening. To ensure desired strength, lower limits of the respective elements are set to 0.010%. On the other hand, when the respective elements are added excessively in excess of 0.100%, steel is excessively hardened so that the punching becomes difficult at the time of performing punching work. Alternatively, cracks are generated on an end surface of a hole after punching work and hence, fatigue strength is lowered. Accordingly, the content of Ti is limited to a value which falls within a range of 0.010% to 0.100%, and the content of Nb is limited to a value which falls within a range of 0.010% to 0.100%.

Sb: 0.0010 to 0.0100%

Sb is an element effective for decreasing an internal oxidization amount generated in a surface layer portion of a steel sheet within a range from a surface of a base steel sheet directly below a galvanized layer to a position 100 μm away from the surface in the steel sheet-side depth direction by suppressing the surface oxidization after coiling through the suppression of oxidization of a surface layer at the time of heating a slab. When the content of Sb is less than 0.0010%, the surface-oxidization suppressing effect is insufficient. There is also a tendency that the surface-oxidization suppressing effect is saturated when the content of Sb exceeds 0.0100%. Accordingly, the content of Sb is limited to a value which falls within a range of 0.0010% to 0.0100%, and is preferably limited to a value which falls within a range of 0.0040% to 0.0080%.

A balance is Fe and unavoidable impurities.

Although the steel sheet contains the above-mentioned components as the basic composition, in the present invention, in addition to the above-mentioned basic composition, the steel sheet may contain one or more kinds of elements selected from a group consisting of Cr, V, Cu, Ni, Sn, Mo and Ta.

Cr: 0.05 to 0.80%, V: 0.01 to 0.10%, Cu: 0.01 to 0.10%, Ni: 0.01 to 0.10%, Sn: 0.001 to 0.010%, Mo: 0.01 to 0.50%, Ta: 0.001 to 0.010%

Cr and V can be added to the steel sheet for enhancing hardenability of steel and for increasing strength of steel. Cu, Ni, Sn and Ta are elements which contribute to strength of steel and can be added to the steel sheet for increasing strength of steel. Mo is an element effective for strengthening of steel by hardening and can be added to the steel sheet for increasing strength of the steel sheet. Lower limits of the respective elements are set to minimum amounts necessary for acquiring desired effects, and upper limits of the respective elements are set to amounts at which the effects are saturated. From the above, when the respective elements are added to the steel sheet, the content of Cr is set to a value which falls within a range 0.05% to 0.80%, the content of V is set to a value which falls within a range of 0.01% to 0.10%, the content of Cu is set to a value which falls within a range of 0.01% to 0.10%, the content of Ni is set to a value which falls within a range of 0.01% to 0.10%, the content of Sn is set to a value which falls within a range of 0.001% to 0.010%, the content of Mo is set to a value which falls within a range of 0.01% to 0.50%, and the content of Ta is set to a value which falls within a range of 0.001% to 0.010%.

REM has an action of controlling the configuration of sulfide-based inclusions without largely changing galvanizing property thus effectively contributing to the enhancement of workability. The steel may contain REM within a range of 0.0001% to 0.1%.

Next, the reason the microstructure of a high strength galvanized steel sheet exhibiting excellent fatigue property is limited is explained.

According to the present invention, it is necessary for the steel sheet to have the microstructure where the microstructure has a ferrite phase having an average grain diameter of 15 μm or less and an area fraction of 60% or more and a martensite phase having an area fraction of 5 to 40%, and one or more kinds of oxides selected from a group consisting of Fe, Si, Mn, Al, P, Nb and Ti which are generated on a surface layer portion of the steel sheet within 100 μm in the steel sheet-side depth direction from a surface of a base steel sheet directly below a galvanized layer are controlled to less than 0.060 $g/m^2$ per one-side surface of the steel sheet.

Due to such microstructure, fatigue property of the steel sheet after punching work is enhanced.

On the steel sheet surface layer in the vicinity of an end surface after punching work, fine cracks are generated by punching work, and the cracks grow during the tensile fatigue test leading to the fracture of the steel sheet. Particularly, cracks which are generated from oxide generated on the surface layer portion of the steel sheet within 100 μm in the steel sheet-side depth direction from the base steel sheet surface directly below the galvanized layer as a initiation point strongly influence fatigue strength. That is, when an internal oxidization amount becomes 0.060 $g/m^2$ or more per one-side surface of the steel sheet, fine cracks which are introduced in punching work before the fatigue test are propagated and connected to each other at an early stage in a tensile fatigue test and hence, fatigue strength of the steel sheet is lowered. Accordingly, in the present invention, amounts of one or more kinds of oxides (internal oxidization amounts) selected from a group consisting of Fe, Si, Mn, Al, P, Nb and Ti generated in the surface layer portion of the steel sheet within 100 μm in the steel-sheet-side depth direction from the surface of the base steel sheet directly below the galvanized layer is limited to less than 0.060 $g/m^2$ per one-side surface of the steel sheet.

To consider a case where the area fraction of the martensite phase exceeds 40% or is less than 5%, even when the internal oxidization amount per one-side surface of steel sheet is less than 0.060 $g/m^2$, the difference in hardness between the ferrite phase and the martensite phase becomes large and hence, a propagation speed of the fine cracks generated in punching work becomes fast thus lowering fatigue strength of the steel sheet during a repeated tensile fatigue test. Accordingly, the area fraction of the martensite phase is limited to a value which falls within a range of 5% to 40%.

Further, the control of an average grain diameter of the ferrite phase and an area fraction of the ferrite phase are also important. By setting the average grain diameter of the ferrite phase to 15 μm or less and by setting the area fraction of the ferrite phase to 60% or more thus making the microstructures of the ferrite phase and the martensite phase uniform, the propagation of fine cracks generated at the time of punching work in the tensile fatigue test can be suppressed thus enhancing fatigue strength of the steel sheet.

Here, the composition of the steel sheet may contain a cementite phase, a bainite phase or a pearlite phase provided that an area fraction of such a phase is set to a value which falls within a range of 5% or less in addition to the ferrite phase having the area fraction of 60% or more and the martensite phase having the area fraction of 5 to 40%.

Next, the manufacturing method of the high strength galvanized steel sheet exhibiting excellent fatigue property is explained.

Molten steel having the above-mentioned composition is made by a usual steel making method which uses a converter or the like, and the molten steel is formed into steel (slab) by a usual casting method such as a continuous casting method.

Next, the obtained steel is subjected to hot rolling where the steel is formed into a hot rolled sheet by heating and rolling. In this hot rolling, a completion temperature of finish rolling is set to an $Ar_3$ point or above, and the hot rolled steel sheet is coiled at a temperature of 600° C. or below.

Completion Temperature of Finish Rolling: $Ar_3$ Point or Above

When a completion temperature of finish rolling is lower than the $Ar_3$ point, a ferrite phase is generated in the surface layer portion of the steel sheet, and the ferrite phase becomes coarse because of the working strain and hence, the microstructure of the steel sheet in the sheet thickness direction becomes non-uniform due to such coarse ferrite phase or the like whereby an area fraction of the ferrite phase cannot be controlled to 60% or more in the microstructure after cold rolling and continuous galvanizing treatment. Accordingly, a completion temperature of finish rolling is set to the $Ar_3$ point or above. Although the $Ar_3$ point can be calculated using a following formula (1), an actually measured temperature may be used.

$$Ar_3=910-310\times[C]-80\times[Mn]+0.35\times(t-0.8) \quad (1)$$

In this formula, [M] indicates the content (mass %) of an element M, and t indicates a sheet thickness (mm). Here, a correction term may be introduced in the formula depending on the contained element. For example, when Cu, Cr, Ni or Mo is contained, a correction term such as $-20\times[Cu]$, $-15\times[Cr]$, $-55\times[Ni]$ or $-80\times[Mo]$ may be added to a right side of the formula (1).

Coiling temperature: 600° C. or less

When a coiling temperature exceeds 600° C., an area fraction of the pearlite phase is increased and hence, the steel sheet after continuous galvanizing treatment has the microstructure where an area fraction of the martensite phase exceeds 40% whereby fatigue property of the steel sheet is lowered. Accordingly, the coiling temperature is limited to 600° C. or below. Here, the coiling temperature is preferably set to 200° C. or above for suppressing the deterioration of a shape of the hot-rolled sheet.

Next, pickling is performed or cold rolling is performed at a reduction rate of 40% or more after pickling.

In pickling, a black scale generated on the surface of the steel sheet is removed. A pickling condition is not particularly limited.

Reduction rate in cold rolling: 40% or more

When the reduction rate in cold rolling is less than 40%, the recrystallization of the ferrite phase hardly advances and hence, in the microstructure of the steel sheet after continuous galvanizing treatment, the ferrite phase and the martensite phase are not uniformly dispersed whereby fine cracks on a punched end surface generated at the time of punching work grow thus lowering fatigue strength of the steel sheet. Accordingly, the reduction rate of cold rolling is set to 40% or more.

Next, continuous galvanizing treatment is performed. In this treatment, the steel is subjected to soaking at a temperature of 700 to 900° C., is subjected to annealing with a dew point in an atmosphere within a temperature range of 700° C. or above set to −40° C. or below, is cooled to a temperature of 600° C. or below at an average cooling rate of 1 to 50° C./sec and, thereafter, is subjected to galvanizing treatment.

To acquire a desired area fraction of the martensite phase, it is necessary to set a soaking temperature to 700° C. or above. When the soaking temperature exceeds 900° C., an average grain diameter of the ferrite phase becomes large and hence, a desired property cannot be obtained. By setting the dew point in the atmosphere within the temperature range of 700° C. or above to −40° C. or below, oxygen potential in an annealing step during continuous galvanizing treatment is lowered, and along with such lowering of the oxygen potential, activity of Si, Mn and the like which are easily-oxidized elements in the steel sheet surface layer portion is lowered. Further, the external oxidization and the internal oxidization of these elements are suppressed and, as a result, an internal oxidization amount generated on the surface layer portion of the steel sheet within 100 μm in the steel-sheet-side depth direction from the surface of the base steel sheet directly below the galvanized layer is decreased thus improving fatigue property of the steel sheet. When the dew point in the atmosphere exceeds −40° C., the internal oxidization amount is increased.

In controlling the dew point in the atmosphere to −40° C. or below, since a usual dew point is higher than −40° C., the dew point is set to −40° C. or below by removing moisture in a furnace by absorption using an absorbent or the like.

Although a lower limit of the dew point in the atmosphere is not particularly defined, when a dew point in atmosphere is below −80° C., the above-mentioned effect is saturated so that such a dew point is disadvantageous in terms of cost whereby it is preferable to set the dew point in the atmosphere to −80° C. or above. The temperature range where the dew point in the atmosphere is controlled is below 700° C., the concentration of Si and Mn on the surface of the steel sheet and the internal oxidization of Si and Mn are not generated and hence, the temperature range where the dew point in the atmosphere is controlled is set to 700° C. or above. Although an upper limit of the temperature range is not particularly defined, when the upper limit of the temperature range exceeds 900° C., it becomes disadvantageous from a viewpoint of the deterioration of rolls in an annealing furnace and the increase of cost whereby it is preferable to set the upper limit of the temperature range to 900° C. or below.

When the hydrogen concentration in the internal atmosphere of the annealing furnace is less than 1 vol %, an activation effect brought about by reduction cannot be acquired and hence, coating peeling resistance is deteriorated. Although an upper limit of the hydrogen concentration is not particularly defined, when the hydrogen concentration exceeds 50 vol %, a cost is pushed up and the above-mentioned effect is saturated. Accordingly, the hydrogen concentration is preferably set to a value which falls within a range of 1 vol % to 50 vol %. Gas components in the annealing furnace include nitrogen and unavoidable impurity gases besides hydrogen. Further, the gas components may contain other gas components provided that other gas components do not damage the advantageous effects of the present invention.

After annealing the steel sheet under the above-mentioned condition, the steel sheet is cooled to 600° C. or below at an average cooling rate of 1 to 50° C./sec. This is because that the generation of pearlite can be prevented and fine ferrite can be precipitated. When the average cooling rate is less than 1° C./sec, pearlite is generated or a ferrite grain diameter is increased. When the average cooling rate exceeds 50° C./sec, an area fraction of a martensite phase exceeds 40%. Further, the reason that the temperature where the steel sheet is cooled at the above-mentioned average cooling rate is set to 600° C.

or below is that an area fraction of the pearlite phase is increased at the temperature which exceeds 600° C. thus lowering fatigue property. Accordingly, the steel sheet is cooled to 600° C. or below at an average cooling rate of 1 to 50° C./sec.

Next, the galvanizing treatment is performed.

Subsequently to the above-mentioned step or after further applying the zinc-coating alloying treatment to the steel sheet, the steel sheet is cooled to a room temperature.

When the alloying treatment is performed succeeding to the galvanizing treatment, it is preferable that, the galvanizing treatment is applied to the steel sheet and, thereafter, the alloying treatment is applied to the steel sheet by heating the steel sheet to a temperature within a range of 450° C. to 600° C., and the content of Fe in a galvanized layer is set to 7 to 15%. When the content of Fe is less than 7%, alloying treatment irregularities occurs or flaking property is deteriorated. On the other hand, when the content of Fe exceeds 15%, the coating peeling resistance is deteriorated.

By performing the above-mentioned treatments, a high strength galvanized steel sheet exhibiting excellent fatigue property according to the present invention can be acquired. As described below, the high strength galvanized steel sheet is characterized by the structure of the surface layer portion of the base steel sheet directly below the galvanized layer.

In the surface layer portion of the steel sheet within 100 μm in the steel sheet-side depth direction from the base steel sheet surface directly below the galvanized layer, an amount of one or more kinds of oxides selected from a group consisting of Fe, Si, Mn, Al, P, Nb and Ti is suppressed to less than 0.060 g/m² per one-side surface of the steel sheet.

Further, the high strength galvanized steel sheet of the present invention preferably has a galvanized layer on a surface of the steel sheet in such a manner that a coating adhesion amount is 20 to 120 g/m² per one-side surface of the steel sheet. When the coating adhesion amount is less than 20 g/m², there is a possibility that it is difficult for the steel sheet to ensure the corrosion resistance. On the other hand, when the coating adhesion amount exceeds 120 g/m², there is a possibility that the coating peeling resistance is deteriorated.

Further, in the present invention, even when various kinds of surface treatments such as chemical conversion treatment are applied to the high strength galvanized steel sheet acquired in the above-mentioned manner, the advantageous effects of the present invention are not deteriorated.

[Embodiment 1]

Hereinafter, the present invention is specifically explained based on embodiments.

Steels (slabs) having the composition shown in Table 1 were used as a starting material. These steels were heated to heating temperatures shown in Table 2 and Table 3 and, thereafter, were subjected to hot rolling under conditions shown in Table 2 and Table 3. After pickling, the steel sheets were subjected to cold rolling and continuous galvanizing treatment subsequently. Some steel sheets were not subjected to cold rolling. Next, steel sheets were, subjected to alloying treatment after continuous galvanizing treatment except for some steel sheets.

In a continuous galvanizing treatment facility, as shown in Table 2 and Table 3, after annealing the steel sheet by passing the steel sheet while controlling soaking temperature and a dew point in a temperature region of 700° C. or above, the steel sheet was cooled to 600° C. or below at an average cooling rate of 1 to 50° C./sec and, subsequently, the steel sheet was subjected to galvanizing treatment in an Al containing Zn bath at a temperature of 460° C. A dew point in an annealing furnace atmosphere in a temperature region other than the region of 700° C. or above was basically set to −35° C.

Further, gas components in the atmosphere were constituted of nitrogen, hydrogen and unavoidable impurity gases, and a dew point below −40° C. was controlled by absorbing and removing moisture in the atmosphere. Hydrogen concentration in the atmosphere was basically set to 10 vol %.

Further, a Zn bath containing 0.14 mass % Al was used for GA, and a Zn bath containing 0.18 mass % Al was used for GI. An adhesion quantity was controlled by gas wiping and alloy treatment was applied in GA.

The evaluation on an inner oxidization amount, the microstructure observation, tensile property and fatigue property was made with respect to the galvanized steel sheets (GA and GI) obtained in the above-mentioned manner. A measuring method is shown in the following.

(1) Internal Oxidization Amount

An internal oxidization amount was measured by an "impulse furnace melting-infrared absorption method". However, it is necessary to subtract an oxygen amount contained in the steel (that is, the high strength steel sheet before being subjected to continuous galvanizing treatment). Accordingly, in the present invention, respective surface layer portions of both surfaces of the high strength steel sheet after continuous galvanizing treatment were polished by 100 μm respectively and the oxygen concentration in steel was measured, and the measured value was set as an amount of oxygen OH contained in the steel. Further, the oxygen concentration in steel in the whole sheet thickness direction of the high strength steel sheet after continuous galvanizing treatment was measured, and the measured value was set as an oxygen amount OI contained in the steel after internal oxidization. Using the oxygen amount OI in the high strength steel sheet after the internal oxidization obtained in this manner and the oxygen amount OH contained in the steel, the difference between OI and OH(=OI−OH) was calculated and, further, a value (g/m²) obtained by converting the difference between OI and OH into an oxygen amount per one-side unit area (that is, 1 m²) was set as an internal oxidization amount.

Further, with respect to the composition of oxide, a surface layer portion of the steel sheet ranging from a surface of a base steel sheet directly below a galvanized layer to a position 100 μm away from the surface in the steel sheet-side depth direction was observed at magnification of 3000 times per 1 field of view using an energy-dispersive X-ray spectrometer (EDS) mounted on the scanning electron microscope (SEM) thus identifying the composition of oxide. The observation was performed in 30 fields of view, and detected elements were determined as the composition of oxide of the observation sample.

(2) Observation of Microstructure

The evaluation of the metallic microstructure was carried out such that an area of the specimen at a position away from a surface of the specimen by ¼ of sheet thickness in cross section parallel to the rolling direction was polished and etched by nital, three respective portions on the cross section were observed using a scanning electron microscope at magnification of 1000 times in 10 fields of view for every position (30 fields of view in total), and images obtained by such observation were measured by image analysis processing using "Image Pro Plus ver.4.0" which is an image analysis software made by Media Cybernetics, Inc. That is, a ferrite phase, a pearlite phase, a cementite phase, a martensite phase, and a bainite phase are discriminated from each other by the image analysis thus obtaining an average grain diameter of the ferrite phase, an area fraction of the ferrite phase and an area fraction of the martensite phase. An average grain diameter of the ferrite phase was obtained such that areas of ferrite grains were obtained by image processing and equivalent diameters of area circles in each field of view were calculated, and an average of these values was obtained (30 fields of view). To be more specific, an equivalent diameter of area circle was obtained by taking an SEM image into the analysis software as digital data and by binarizing the digital data. An area fraction of the ferrite phase and an area fraction of the martensite phase were respectively obtained by discriminating the respective phases on a digital image and by performing image processing for every measurement field of view. Area fractions of the respective phases were obtained by averaging these values (30 fields of view).

(3) Tensile Test

With respect to tensile strength, JIS No. 5 tensile specimens were sampled from the obtained steel sheet such that the rolling direction becomes the tensile direction and a tensile test was carried out in accordance with JIS Z2241. In the tensile test, tensile strength was obtained by carrying out the tensile test until the tensile specimen was broken.

The substantially equal tests were carried out twice for every specimen, an average value of the tensile strengths was obtained, and the obtained average value was set as the tensile strength of the specimen.

(4) Tensile Fatigue Test

For evaluating fatigue property of the obtained steel sheets after punching work, test pieces for fatigue test (size: 50 mm×260 mm) were sampled from the obtained steel sheets and tensile fatigue specimens having a size: 45 mm×250 mm, a parallel portion width: 30 mm and R: 100 mm were prepared from the test pieces, and a hole having a diameter of 10 mmφ was formed at the center of the specimen by punching work with a clearance of 10%. Thereafter, a tensile fatigue test was carried out until the repetition number reaches $2 \times 10^6$ using a servo pulser made by SHIMADZU CORPORATION in a state where a stress ratio was set to 0.1, a repetition cycle was set to 20 Hz and a maximum stress was fixed, and the fatigue strength at the repetition number of $2 \times 10^6$ was obtained. Average fatigue strength was obtained by carrying out the substantially equal test three times.

The result obtained by the above-mentioned test was shown in Table 2 and Table 3 in conjunction with conditions.

TABLE 1

| | (mass %) | | | | | | | | | | |
|---|---|---|---|---|---|---|---|---|---|---|---|
| steel No. | C | Si | Mn | P | S | Al | N | Ti | Nb | Sb | Cr |
| A | 0.09 | 0.45 | 1.5 | 0.032 | 0.0054 | 0.033 | 0.0041 | 0.011 | 0.035 | 0.0016 | — |
| B | 0.08 | 0.24 | 1.6 | 0.028 | 0.0025 | 0.035 | 0.0034 | 0.012 | 0.023 | 0.0021 | — |
| C | 0.07 | 0.01 | 2.1 | 0.015 | 0.0030 | 0.020 | 0.0043 | 0.019 | 0.056 | 0.0017 | — |
| D | 0.07 | 0.02 | 1.9 | 0.013 | 0.0034 | 0.018 | 0.0032 | 0.016 | 0.042 | 0.0019 | — |
| E | 0.05 | 0.02 | 2.2 | 0.014 | 0.0027 | 0.015 | 0.0031 | 0.020 | 0.038 | 0.0029 | — |
| F | 0.08 | 0.15 | 1.8 | 0.028 | 0.0031 | 0.024 | 0.0035 | 0.025 | 0.034 | 0.0024 | — |
| G | 0.10 | 0.04 | 1.7 | 0.011 | 0.0038 | 0.045 | 0.0037 | 0.013 | 0.047 | 0.0017 | — |
| H | 0.09 | 0.26 | 2.0 | 0.027 | 0.0012 | 0.036 | 0.0048 | 0.024 | 0.039 | 0.0013 | — |
| I | 0.08 | 0.17 | 2.1 | 0.046 | 0.0033 | 0.022 | 0.0036 | 0.017 | 0.041 | 0.0026 | — |
| J | 0.08 | 1.53 | 1.3 | 0.019 | 0.0026 | 0.031 | 0.0039 | 0.011 | 0.012 | 0.0022 | — |
| K | 0.07 | 0.02 | 2.4 | 0.016 | 0.0029 | 0.027 | 0.0022 | 0.018 | 0.054 | 0.0018 | — |
| L | 0.13 | 0.21 | 1.9 | 0.022 | 0.0035 | 0.019 | 0.0034 | 0.014 | 0.037 | 0.0021 | — |
| M | 0.11 | 0.35 | 1.3 | 0.031 | 0.0009 | 0.026 | 0.0044 | 0.026 | 0.060 | 0.0019 | — |
| N | 0.08 | 0.12 | 1.9 | 0.024 | 0.0036 | 0.032 | 0.0028 | 0.086 | 0.012 | 0.0013 | — |
| O | 0.09 | 0.23 | 1.7 | 0.030 | 0.0028 | 0.030 | 0.0041 | 0.011 | 0.011 | 0.0012 | 0.21 |
| P | 0.10 | 0.14 | 2.1 | 0.027 | 0.0037 | 0.029 | 0.0033 | 0.020 | 0.046 | 0.0032 | — |
| Q | 0.07 | 1.93 | 1.8 | 0.021 | 0.0034 | 0.021 | 0.0036 | 0.026 | 0.053 | 0.0030 | — |
| R | 0.08 | 0.02 | 2.1 | 0.015 | 0.0029 | 0.034 | 0.0027 | 0.012 | 0.012 | 0.0013 | — |
| S | 0.09 | 0.16 | 2.0 | 0.029 | 0.0032 | 0.033 | 0.0040 | 0.023 | 0.011 | 0.0012 | 0.05 |
| a | 0.08 | 0.02 | 2.0 | 0.020 | 0.0024 | 0.035 | 0.0038 | <u>0.001</u> | <u>0.002</u> | 0.0025 | — |
| b | 0.09 | 0.18 | 1.7 | 0.033 | 0.0016 | 0.040 | 0.0032 | 0.013 | 0.035 | <u>0.0004</u> | — |
| c | 0.10 | 0.05 | <u>2.9</u> | 0.010 | 0.0027 | 0.026 | 0.0021 | 0.024 | 0.057 | 0.0020 | — |
| d | <u>0.19</u> | 0.07 | 2.0 | 0.025 | 0.0035 | 0.042 | 0.0019 | 0.031 | 0.028 | 0.0016 | — |
| e | 0.11 | <u>2.40</u> | 2.0 | 0.023 | 0.0029 | 0.038 | 0.0027 | 0.034 | 0.022 | 0.0041 | — |

| steel No. | V | Cu | Ni | Sn | Mo | Ta | $Ar_3$(° C.) | remarks |
|---|---|---|---|---|---|---|---|---|
| A | — | — | — | — | — | — | 762 | present invention example |
| B | 0.05 | — | — | — | — | — | 756 | present invention example |
| C | — | — | — | — | — | — | 721 | present invention example |
| D | — | — | — | — | — | — | 737 | present invention example |
| E | — | — | — | — | — | — | 719 | present invention example |
| F | — | 0.02 | — | — | — | — | 741 | present invention example |
| G | — | — | 0.02 | — | — | — | 742 | present invention example |
| H | — | — | — | 0.002 | — | — | 722 | present invention example |
| I | — | — | — | — | 0.03 | — | 715 | present invention example |
| J | — | — | — | — | — | — | 781 | present invention example |
| K | — | — | — | — | — | — | 697 | present invention example |
| L | — | — | — | — | — | — | 718 | present invention example |
| M | — | — | — | — | — | — | 772 | present invention example |
| N | — | — | — | — | — | — | 733 | present invention example |
| O | 0.04 | — | — | — | — | 0.002 | 743 | present invention example |
| P | — | — | — | — | — | — | 711 | present invention example |
| Q | — | — | — | — | — | — | 745 | present invention example |
| R | — | — | — | — | 0.14 | — | 706 | present invention example |
| S | 0.04 | — | — | — | 0.13 | — | 711 | present invention example |

TABLE 1-continued

| | | | | | | | | (mass %) | |
|---|---|---|---|---|---|---|---|---|---|
| a | — | — | — | — | — | — | — | 725 | comparison example |
| b | — | — | — | — | — | — | — | 746 | comparison example |
| c | — | — | — | — | — | — | — | 647 | comparison example |
| d | — | — | — | — | — | — | — | 691 | comparison example |
| e | — | — | — | — | — | — | — | 716 | comparison example | underlined parts: outside the scope of the present invention

TABLE 2

| steel sheet No. | steel No. | hot rolling condition ||||| continuous galvanizing and galvannealing conditions ||  |
|---|---|---|---|---|---|---|---|---|---|
| | | heating temperature (° C.) | finish rolling temperature (° C.) | coiling temperature (° C.) | reduction rate (%) | sheet thickness (mm) | soaking temperature (° C.) | dew point at 700° C. or above (° C.) | alloying treatment |
| 1 | A | 1220 | 850 | 550 | 60 | 1.4 | 820 | −45 | performed |
| 2 | B | 1220 | 850 | 570 | 60 | 1.4 | 820 | −45 | performed |
| 3 | C | 1200 | 850 | 570 | 60 | 1.4 | 820 | −45 | performed |
| 4 | D | 1200 | 850 | 570 | 60 | 1.4 | 820 | −45 | performed |
| 5 | E | 1200 | 850 | 570 | — | 2.0 | 820 | −45 | performed |
| 6 | F | 1200 | 850 | 570 | 60 | 1.4 | 820 | −45 | performed |
| 7 | G | 1200 | 850 | 570 | 60 | 1.4 | 820 | −45 | performed |
| 8 | H | 1200 | 850 | 570 | 60 | 1.4 | 820 | −45 | performed |
| 9 | I | 1200 | 850 | 570 | 60 | 1.4 | 820 | −45 | performed |
| 10 | J | 1200 | 850 | 570 | 60 | 1.4 | 820 | −45 | performed |
| 11 | K | 1200 | 850 | 550 | 60 | 1.4 | 820 | −45 | performed |
| 12 | L | 1200 | 850 | 550 | 60 | 1.4 | 820 | −45 | performed |
| 13 | M | 1200 | 850 | 550 | 60 | 1.4 | 820 | −45 | performed |
| 14 | N | 1200 | 850 | 570 | 60 | 1.4 | 820 | −45 | performed |
| 15 | O | 1250 | 850 | 570 | 60 | 1.4 | 820 | −45 | performed |
| 16 | P | 1250 | 850 | 570 | 60 | 1.4 | 820 | −45 | performed |
| 17 | Q | 1200 | 850 | 570 | 60 | 1.4 | 820 | −45 | performed |
| 18 | R | 1200 | 850 | 570 | 60 | 1.4 | 820 | −45 | performed |
| 19 | S | 1200 | 850 | 570 | 60 | 1.4 | 820 | −45 | performed |
| 20 | a | 1200 | 850 | 570 | 60 | 1.4 | 820 | −45 | performed |
| 21 | b | 1200 | 850 | 570 | 60 | 1.4 | 820 | −45 | performed |
| 22 | c | 1200 | 850 | 570 | 60 | 1.4 | 820 | −45 | performed |
| 23 | d | 1200 | 850 | 570 | 60 | 1.4 | 820 | −45 | performed |
| 24 | e | 1200 | 850 | 570 | 60 | 1.4 | 820 | −45 | performed |

| steel sheet No. | microstructure ||||| properties || remarks |
|---|---|---|---|---|---|---|---|---|
| | internal oxidization amount (g/m²) | ferrite grain diameter (μm) | area fraction of ferrite (%) | area fraction of martensite (%) | other microstructures | tensile strength (MPa) | fatigue strength (MPa) | |
| 1 | 0.026 | 11 | 81 | 15 | cementite, pearlite | 653 | 304 | present invention example |
| 2 | 0.023 | 9 | 82 | 14 | cementite | 671 | 318 | present invention example |
| 3 | 0.017 | 13 | 79 | 17 | cementite | 668 | 307 | present invention example |
| 4 | 0.019 | 10 | 82 | 15 | cementite | 642 | 292 | present invention example |
| 5 | 0.021 | 13 | 85 | 12 | cementite, bainite | 615 | 296 | present invention example |
| 6 | 0.019 | 11 | 77 | 19 | cementite | 639 | 311 | present invention example |
| 7 | 0.017 | 10 | 73 | 23 | cementite | 704 | 293 | present invention example |
| 8 | 0.024 | 12 | 84 | 13 | cementite | 656 | 289 | present invention example |
| 9 | 0.020 | 11 | 70 | 26 | cementite | 687 | 295 | present invention example |
| 10 | 0.043 | 9 | 86 | 11 | cementite | 649 | 297 | present invention example |
| 11 | 0.035 | 10 | 66 | 30 | cementite, bainite | 713 | 286 | present invention example |

TABLE 2-continued

| | | | | | | | | | |
|---|---|---|---|---|---|---|---|---|---|
| | 12 | 0.022 | 10 | 68 | 28 | cementite | 724 | 290 | present invention example |
| | 13 | 0.027 | 9 | 89 | 7 | cementite, pearlite | 608 | 322 | present invention example |
| | 14 | 0.018 | 8 | 78 | 18 | cementite | 665 | 308 | present invention example |
| | 15 | 0.021 | 11 | 75 | 22 | cementite | 651 | 294 | present invention example |
| | 16 | 0.019 | 12 | 80 | 17 | cementite | 637 | 302 | present invention example |
| | 17 | 0.053 | 13 | 88 | 8 | cementite | 606 | 315 | present invention example |
| | 18 | 0.017 | 13 | 77 | 21 | cementite | 662 | 296 | present invention example |
| | 19 | 0.019 | 9 | 75 | 22 | cementite, pearlite | 658 | 310 | present invention example |
| | 20 | 0.020 | 13 | 71 | 26 | cementite | 507 | 307 | comparison example |
| | 21 | 0.022 | 12 | 78 | 18 | cementite | 633 | 184 | comparison example |
| | 22 | 0.018 | 10 | 55 | 42 | cementite | 796 | 193 | comparison example |
| | 23 | 0.019 | 9 | 53 | 43 | cementite | 801 | 186 | comparison example |
| | 24 | 0.058 | 17 | 76 | 21 | cementite | 535 | 187 | comparison example | underlined parts: outside the scope of the present invention

TABLE 3

| | | hot rolling condition | | | | | continuous galvanizing and galvannealing conditions | | |
|---|---|---|---|---|---|---|---|---|---|
| steel sheet No. | steel No. | heating temperature (° C.) | finish rolling temperature (° C.) | coiling temperature (° C.) | reduction rate (%) | sheet thickness (mm) | soaking temperature (° C.) | dew point at 700° C. or above (° C.) | alloying treatment |
| 25 | B | 1240 | 710 | 550 | 60 | 1.4 | 820 | −45 | performed |
| 26 | B | 1240 | 830 | 680 | 60 | 1.4 | 820 | −45 | performed |
| 27 | B | 1240 | 830 | 570 | 60 | 1.4 | 820 | −40 | performed |
| 28 | B | 1240 | 830 | 570 | 60 | 1.4 | 820 | −45 | performed |
| 29 | B | 1240 | 830 | 570 | 60 | 1.4 | 820 | −60 | performed |
| 30 | B | 1240 | 830 | 570 | 60 | 1.4 | 820 | −30 | performed |
| 31 | B | 1240 | 830 | 570 | 60 | 1.4 | 820 | −35 | performed |
| 32 | B | 1240 | 830 | 570 | 60 | 1.4 | 820 | −37 | performed |
| 33 | B | 1240 | 830 | 570 | 20 | 2.8 | 820 | −45 | performed |
| 34 | B | 1240 | 830 | 570 | 40 | 2.1 | 820 | −45 | performed |
| 35 | D | 1220 | 850 | 580 | 60 | 1.4 | 850 | −45 | performed |
| 36 | D | 1220 | 850 | 580 | 60 | 1.4 | 910 | −45 | performed |
| 37 | D | 1220 | 850 | 580 | 60 | 1.4 | 850 | −60 | performed |
| 38 | D | 1220 | 850 | 580 | 60 | 1.4 | 670 | −45 | performed |
| 39 | D | 1220 | 850 | 580 | 60 | 1.4 | 850 | −35 | not performed |
| 40 | D | 1220 | 850 | 580 | 60 | 1.4 | 850 | −45 | not performed |
| 41 | Q | 1200 | 820 | 550 | 60 | 1.4 | 830 | −45 | performed |
| 42 | Q | 1200 | 820 | 550 | 60 | 1.4 | 830 | −30 | performed |
| 43 | b | 1240 | 830 | 650 | 60 | 1.4 | 840 | −45 | performed |
| 44 | b | 1240 | 830 | 560 | 60 | 1.4 | 840 | −35 | performed |

| | | microstructure | | | | properties | | |
|---|---|---|---|---|---|---|---|---|
| steel sheet No. | internal oxidization amount (g/m$^2$) | ferrite grain diameter (μm) | area fraction of ferrite (%) | area fraction of martensite (%) | other microstructures | tensile strength (MPa) | fatigue strength (MPa) | remarks |
| 25 | 0.016 | 13 | 57 | 38 | cementite, pearlite | 684 | 196 | comparison example |
| 26 | 0.021 | 12 | 53 | 44 | cementite, pearlite | 667 | 183 | comparison example |
| 27 | 0.055 | 10 | 79 | 17 | cementite | 659 | 312 | present invention example |
| 28 | 0.014 | 11 | 81 | 15 | cementite | 653 | 305 | present invention example |
| 29 | 0.009 | 11 | 82 | 16 | cementite | 648 | 314 | present invention example |

TABLE 3-continued

| | | | | | | | | |
|---|---|---|---|---|---|---|---|---|
| 30 | <u>0.088</u> | 12 | 77 | 19 | cementite | 642 | 193 | comparison example |
| 31 | <u>0.076</u> | 11 | 79 | 17 | cementite | 639 | 207 | comparison example |
| 32 | <u>0.065</u> | 12 | 75 | 21 | cementite | 661 | 194 | comparison example |
| 33 | 0.023 | 13 | <u>56</u> | <u>42</u> | cementite, pearlite | 670 | 188 | comparison example |
| 34 | 0.019 | 12 | 79 | 18 | cementite | 665 | 291 | present invention example |
| 35 | 0.022 | 10 | 81 | 16 | cementite | 662 | 303 | present invention example |
| 36 | 0.020 | <u>18</u> | 83 | 15 | cementite, bainite | 611 | 198 | comparison example |
| 37 | 0.009 | 11 | 82 | 14 | cementite | 629 | 286 | present invention example |
| 38 | 0.011 | 13 | 92 | <u>4</u> | cementite, pearlite | 603 | 184 | comparison example |
| 39 | <u>0.072</u> | 11 | 79 | 18 | cementite | 647 | 195 | comparison example |
| 40 | 0.018 | 12 | 80 | 17 | cementite | 636 | 307 | present invention example |
| 41 | 0.052 | 10 | 86 | 12 | cementite | 608 | 319 | present invention example |
| 42 | <u>0.095</u> | 13 | 86 | 11 | cementite | 614 | 211 | comparison example |
| 43 | 0.024 | 11 | <u>57</u> | <u>41</u> | cementite, pearlite | 642 | 183 | comparison example |
| 44 | <u>0.073</u> | 10 | <u>56</u> | <u>42</u> | cementite | 647 | 196 | comparison example | underlined parts: outside the scope of the present invention

From Table 2 and Table 3, in the present invention examples within the scope of the present invention where the microstructure includes a ferrite phase having an average grain diameter of 15 μm or less and an area fraction of 60% or more and a martensite phase having an area fraction of 5 to 40%, and an amount of one or more kinds of oxide selected from a group consisting of Fe, Si, Mn, Al, P, Nb and Ti generated on a surface layer portion of the steel sheet within a range from a surface of a base steel sheet directly below a galvanized layer 100 μm away from the surface in a steel-sheet-side depth direction is less than 0.060 g/m² per one-side surface of the steel sheet, the fatigue strength in the tensile fatigue test was high.

On the other hand, in the comparison examples, the fatigue strength in the tensile fatigue test was low or the tensile strength is low. Particularly, it is understood that in the comparison examples where the composition is not proper, the fatigue strength in the tensile fatigue test could not be improved even when the average grain diameter of the ferrite phase, the area fraction of the ferrite phase, the area fraction of the martensite phase and the inner oxidization amount are properly set.

[Industrial Applicability]

The high strength galvanized steel sheet of the present invention exhibits excellent fatigue property and can be used as a surface treatment steel sheet for realizing the reduction of weight and the strengthening of a vehicle body per se of an automobile.

The invention claimed is:

1. A high strength galvanized steel sheet exhibiting excellent fatigue property, the steel sheet having a composition containing by mass % 0.03 to 0.15% C, 2.00% or less Si, 1.0 to 2.5% Mn, 0.050% or less P, 0.0100% or less S, 0.050% or less Al, 0.0050% or less N, 0.010 to 0.100% Ti, 0.010 to 0.100% Nb, 0.0010 to 0.0100% Sb, and Fe and unavoidable impurities as a balance, wherein
   the microstructure includes a ferrite phase having an average grain diameter of 15 μm or less and an area fraction of 60% or more and a martensite phase having an area fraction of 5 to 40%, and
   an amount of one or more kinds of oxide selected from a group consisting of Fe, Si, Mn, Al, P, Nb and Ti generated in a surface layer portion of the steel sheet within a range from a surface of a base steel sheet directly below a galvanized layer to 100 μm away from the surface in a direction of steel-sheet-side depth, an amount of all of the one or more oxides being less than 0.060 g/m² and more than 0g/m² per one-side surface of the steel sheet.

2. The high strength galvanized steel sheet exhibiting excellent fatigue property according to claim 1, wherein the composition further contains by mass % one or more kinds of elements selected from a group consisting of 0.05 to 0.80% Cr, 0.01 to 0.10% V, 0.01 to 0.10% Cu, 0.01 to 0.10% Ni, 0.001 to 0.010% Sn, 0.01 to 0.50% Mo, and 0.001 to 0.010% Ta.

\* \* \* \* \*